(12) United States Patent
Candy

(10) Patent No.: US 6,686,742 B2
(45) Date of Patent: Feb. 3, 2004

(54) GROUND MINERALIZATION REJECTING METAL DETECTOR (POWER SAVING)

(75) Inventor: Bruce Halcro Candy, Basket Range (AU)

(73) Assignee: BHC Consulting PTY LTD, Glenside (AU)

( * ) Notice: Subject to any disclaimer, the term of this patent is extended or adjusted under 35 U.S.C. 154(b) by 0 days.

(21) Appl. No.: 09/978,202

(22) Filed: Oct. 17, 2001

(65) Prior Publication Data

US 2002/0053907 A1 May 9, 2002

(30) Foreign Application Priority Data

Oct. 17, 2000 (AU) .............................. PR 0838

(51) Int. Cl.[7] .................... G01V 3/10; G01V 3/165
(52) U.S. Cl. ........................ 324/329; 324/239
(58) Field of Search .................. 324/239, 327–330, 324/334, 336

(56) References Cited

U.S. PATENT DOCUMENTS

| | | | |
|---|---|---|---|
| 4,157,579 A | * 6/1979 | Paul | 324/330 X |
| 4,276,484 A | * 6/1981 | Riveros | 324/334 X |
| 4,410,926 A | * 10/1983 | Hafner et al. | 361/156 X |
| 4,868,504 A | * 9/1989 | Johnson | 324/329 |
| 4,942,360 A | * 7/1990 | Candy | 324/329 |
| 5,498,958 A | * 3/1996 | Tu et al. | 324/239 X |
| 5,525,907 A | * 6/1996 | Frazier | 324/334 |
| 6,326,790 B1 | * 12/2001 | Ott et al. | 324/329 X |

* cited by examiner

*Primary Examiner*—Gerard R. Strecker
(74) *Attorney, Agent, or Firm*—Finnegan, Henderson, Farabow, Garrett & Dunner, L.L.P.

(57) ABSTRACT

A metal detector apparatus including a transmit coil which transmits a magnetic field, transmit timing control circuitry which also includes timing for a semiconductor switch, and receive signal circuitry and receive signal processing circuitry, with a transmit coil damping network including at least one resistor connected in series with the semiconductor switch across the transmit coil, and timing control circuitry which generates a timing sequence which is selected so that for at least some of the time no transmit field is generated and at least during part of the transmit signal, the first semiconductor switch is controlled to be off and is turned on before the cessation of the transmit field.

5 Claims, 1 Drawing Sheet

GROUND MINERALIZATION REJECTING METAL DETECTOR (POWER SAVING)

BACKGROUND OF THE INVENTION

This invention relates to an improved ground mineralisation rejecting metal detector and in particular to an arrangement to assist in power saving.

In U.S. Pat. No. 5,576,624 I disclosed a metal detector apparatus which is capable of substantially reducing signals arising from ground mineralisation containing magnetic soils. Several models utilizing these principles have been commercialised and used highly successfully by gold prospectors and for land mine detection. Both land-mine de-miners and prospectors desire low power consumption so that battery weight and costs are low and operating life is extended. The aim of this invention is to improve upon power consumption.

In U.S. Pat. No. 5,576,624 I disclose a metal detector apparatus which transmits a pulse induction waveform. The advantages of pulse sequence containing pulses of different duration are disclosed. The received signal response from magnetic soils is approximately the same for all such soils (except for the overall amplitude). In contrast, the response from metal targets vary substantially. Hence if a proportion of one part of the received signal is subtracted from a linear combination of a different part of the received signal, It is possible to select the coefficients of the said linear combination such that the response from magnetic soils are cancelled. In general, a particular said linear combination resulting in magnetic soil signal cancellation, a first linear combination, will not result in cancellation of most metal targets, except for some particular metal targets with a particular eddy current time constant decay, a first eddy current decay time constant, which happens to also result in a zero first linear combination result. In order to detect targets with the said first eddy current decay time constant, a different linear combination of different sampled receive signals, a second linear combination, is required to cancel magnetic soil response and not cancel the said first eddy current time constant decay signal. Likewise the said second linear combination will cancel a particular metal eddy current decay signal, a second eddy current time constant decay, which will not be cancelled by the said first linear combination if chosen appropriately. Thus by simultaneously measuring and calculating at least two different linear combinations, all metal targets may be detected and magnetic soil signals approximately cancelled.

Also in U.S. Pat. No. 5,576,624 I disclosed a metal detector apparatus which is insensitive to induced e.m.f. signals from movement of a search coil relative to the earth's magnetic field and magnetic fields from magnetic soils and rocks. This is achieved by selecting the total integrated receive signal over a complete cycle to be zero.

An object of this invention is to provide improvements to apparatus of the foregoing type where there can be effected some power saving improvement.

In one form of this invention there is proposed a metal detector apparatus including a transmit coil adapted to transmit a magnetic field when operating with electrical current flowing through the said transmit coil, transmit timing control circuitry which also includes timing for a first semiconductor switch, and receive signal circuitry and receive signal processing circuitry;

wherein a damping network including at least one resistor is connected in series with the said first semiconductor switch across the transmit coils and the timing control circuitry generates a timing sequence which is selected so that for at least some of the time no transmit field is generated and at least during part of the transmit signal, the first semiconductor switch is controlled to be off and is turned on before the cessation of the transmit field.

In preference, in a further form of this invention this can be said to reside in a metal detector apparatus including a transmit coil adapted to transmit a magnetic field when operating with electrical current flowing through the said transmit coil, at least one power supply, a first power supply, and transmit timing control circuitry which also includes timing circuitry for a switch mode power supply, and receive signal circuitry and receive signal processing circuitry;

wherein the transmit coil is controlled so that a back e.m.f. following the transmit coil current energising derived from power from the said first power supply, causes current to flow to a capacitor, a first capacitor, and the said switch mode power is adapted to transfer energy from the first capacitor to another power supply which may be the said first power supply.

In a further form of the invention it can be said to reside in a metal detector apparatus including a transmit coil adapted to transmit a magnetic field when operating with electrical current flowing through the said transmit coil, at least one power supply, a first power supply, and transmit timing control circuitry which also includes timing circuitry for a switch mode power supply, and receive signal circuitry and receive signal processing circuitry;

wherein a transmit coil damping network including at least one resistor is connected in series with the said first semiconductor switch across the transmit coil, and the timing control circuitry generates a timing sequence which is selected so that for at least some of the time no transmit field is generated and at least during part of the transmit signal, the first semiconductor switch is controlled to be off and is turned on before the cessation of the transmit field, whereby the transmit coil is controlled so that a back e.m.f. following the transmit coil current energising period derived from energy from the said first power supply, causes current to flow to a capacitor, a first capacitor, and the said switch mode power is adapted to transfer energy from the first capacitor to the said third power supply.

in preference, the switch mode power supply is adapted to operate during transmission and not reception.

In preference, the timing control to the switch mode power supply is adapted by means of a negative feedback servo loop to maintain the average voltage across the first capacitor to a selected value when the apparatus is operating.

Most pulse induction metal detectors transmit a monopolar transmit signal generated by applying a voltage to a transmit coil, which may also be used for receiving, of typically negative several volts for typically several tens or hundreds of microseconds, and at the cessation of this applied voltage, the resulting back e.m.f. is typically clamped to a few hundred volts and the energy thus dissipated as heat.

BRIEF DESCRIPTION OF THE DRAWINGS

For a better understanding of this invention this will now be described with reference to a preferred embodiment which shall be described with the assistance of drawings wherein.

Pulse induction metal detectors dissipate most of the back e.m.f. energy as heat. I have discovered two new means of reducing this power wastage. One means is to connect at least one switch mode power supply between at least one of the back e.m.f. clamping capacitors and ground and one or more of the low voltage supplies, preferably with a servo loop which regulates the power transferred from the back e.m.f. capacitor or capacitors to the said low voltage supplies so that the voltage or voltages across the back e.m.f. capacitor or capacitors is regulated to a selected voltage or voltages. Another means is to connect a semiconductor switch between the transmit coil damping resistor and ground. This is open circuit during transmission and most of the back e.m.f. and is turned on just before the back e.m.f. drops below the clamping voltage or voltages and dept on during the receiving periods.

Figure 1:
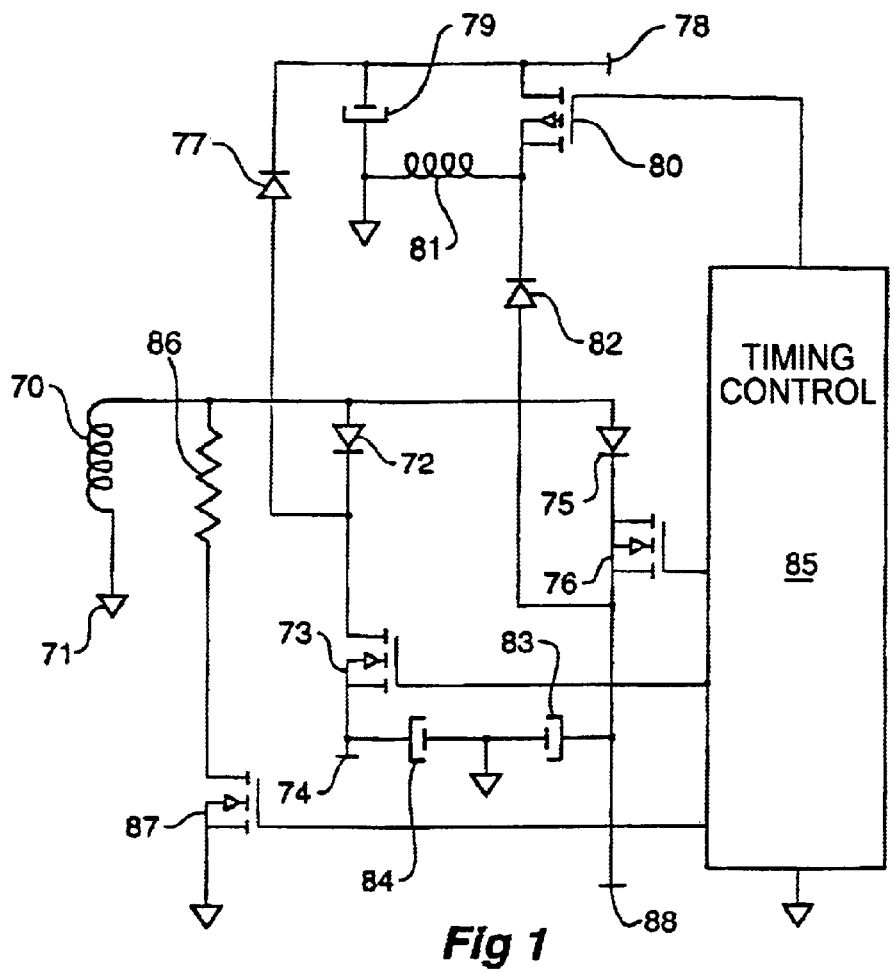
FIG. 1 is an example of new power saving circuitry for pulse induction metal detectors.

One such arrangement is shown in FIG. 1. Transmit coil 70 is connected between earth 71 and the transmit electronics output which is connected to diodes 72 and 75 and resistor 86. 72 is connected to switch 73, an N-channel FET, whose source is connected to supply voltage 74. 75 is connected to switch 76, an N-channel FET, whose source is connected to supply voltage 88. Capacitors 84 and 83 A/C couple these supplies to ground. Diode 77 is connected to supply voltage 78 and between the cathode of 72 and capacitor 79 which is connected to ground. A switch mode power supply consisting of switch 80, a P-channel FET as shown in this example, inductor 81 and diode 82 transfers stored energy from capacitor 79 to supply 88 in this example. The gates of the switching FETs 73, 76 and 80 are controlled by the timing control circuitry 85. This said switch mode supply may be controlled to regulate the voltage across 79.

Figure 2:
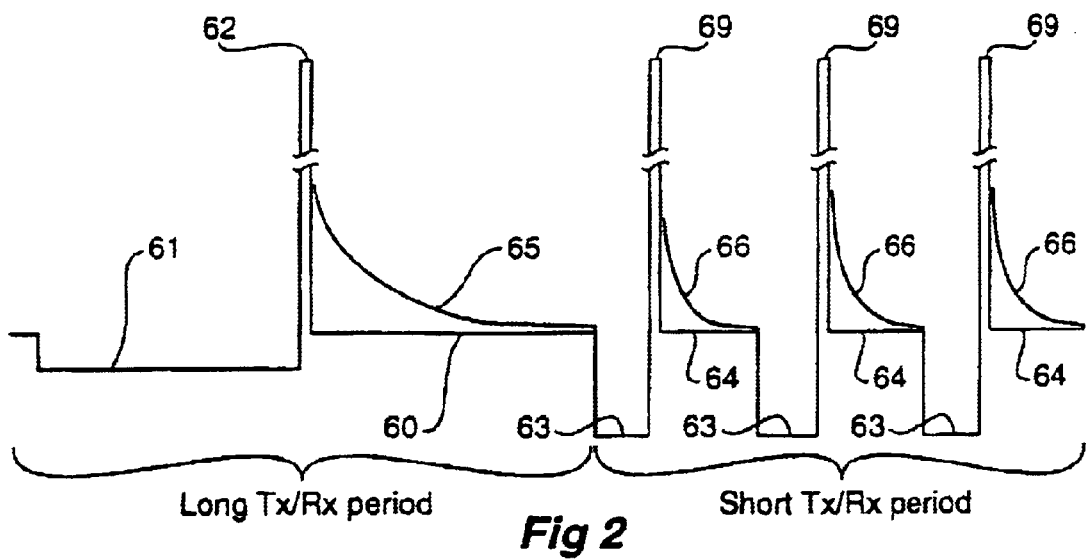
FIG. 2 is an example of a transmit signal and typical receive signal of a pulse induction waveform which may be generated by the circuit in FIG. 1.

Beside the improved efficiency owing to some of the energy being returned from that stored during the back-emf collapse, further advantage can be gained by switching out the coil damping resistor during most of the back-emf periods. A damping resistor 86 is connected across the transmit coil in series with a switch, an N-channel FET 87. During transmission, for example, periods 61, 62, 63, and 69 in FIG. 2, 87 is turned off. Just before the end of the back e.m.f. periods, that is 62 and 69 in FIG. 2, this FET is turned on and resistor 86 is thus connected across the coil to damp the back e.m.f. (Note that during periods 61 and 63, many FETs will conduct owing to internal diode action.) 85 controls 87. The switch mode signals may interfere with the weak receive signals during the receive periods, so there can be advantage in only allowing the switch mode supply to operate during periods of transmission and not reception. Throughout this specification the purpose has been to illustrate the invention and not to limit this.

The claims defining the invention are as follows:

1. A metal detector apparatus comprising:
   a transmit coil adapted to transmit a magnetic field, the transmit coil being energized by electrical current flowing therethrough,
   transmit timing control circuitry that includes timing for a first semiconductor switch, and receive signal circuitry and receive signal processing circuitry;
   a transmit coil damping network including at least one resistor connected in series with the said first semiconductor switch across the transmit coil,
   whereas the timing control circuitry generates a timing sequence selected so that for a period of time no transmit field is generated and at least during part of the energization of the coil the first semiconductor switch is controlled to be off and is turned on before the cessation of the transmit field whereby said resistor damps a back e.m.f. across said coil when said first semiconductor switch is on.

2. A metal detector apparatus comprising:
   a transmit coil adapted to transmit a magnetic field when operating with electrical current flowing through the transmit coil;
   at least a power supply;
   transmit timing control circuitry adapted to provide periods of energization applied to said transmit coil and including timing circuitry for a switch mode power supply;
   receive signal circuitry;
   receive signal processing circuitry;
   means to control the transmit coil so that a back e.m.f. following the transmit coil current energizing period derived from energy from the said power supply, causes current to flow to a first capacitor,
   and wherein the said switch mode power supply is adapted to transfer energy from the first capacitor to the power supply.

3. A metal detector apparatus comprising:
   a transmit coil adapted to transmit a magnetic field when operating with electrical current flowing through the transmit coil;
   a power supply, and transmit timing control circuitry adapted to provide periods of energization applied to said transmit coil and which also includes timing circuitry for a switch mode power supply,
   receive signal circuitry,
   and receive signal processing circuitry;
   wherein a transmit coil damping network, including at least one resistor, is connected in series with a first semiconductor switch across the transmit coil, and the timing control circuitry generates a timing sequence which is selected so that for a period of time no transmit field is generated and at least during part of the magnetic field of transmission, the first semiconductor switch is controlled to be off and is turned on before the cessation of the transmit field,
   whereby the transmit coil is controlled so that a back e.m.f. following the transmit coil current energizing period derived from energy from the said power supply, causes current to flow to a capacitor,
   and the said switch mode power is adapted to transfer energy from the first capacitor to the said power supply.

4. A metal detector apparatus as in claim 2 or 3 wherein the switch mode power supply is adapted to operate during transmission and not reception.

5. A metal detector apparatus as in claim 2 wherein the said timing control to the said switch mode power supply comprises a negative feedback servo loop to maintain the average voltage across the first capacitor to a selected value when the apparatus is operating.

* * * * *